United States Patent
Shyu

(10) Patent No.: US 7,302,221 B2
(45) Date of Patent: Nov. 27, 2007

(54) DUPLEX HINGE DEVICE AND A MULTI-FUNCTION PERIPHERAL USING THE SAME

(75) Inventor: Devon Shyu, Kuei Jen Hsiang (TW)

(73) Assignee: Avision Inc. (TW)

( * ) Notice: Subject to any disclaimer, the term of this patent is extended or adjusted under 35 U.S.C. 154(b) by 399 days.

(21) Appl. No.: 10/988,502

(22) Filed: Nov. 16, 2004

(65) Prior Publication Data

US 2005/0134940 A1    Jun. 23, 2005

(30) Foreign Application Priority Data

Nov. 20, 2003   (TW)   ................................ 92132478 A

(51) Int. Cl.
*G03G 15/00*  (2006.01)
*G03G 21/00*  (2006.01)

(52) U.S. Cl. ...................... 399/367; 399/107; 399/124; 399/125

(58) Field of Classification Search ................ 399/107, 399/110, 118, 124, 125, 367, 380; 358/474; 403/119, 164; 49/381; 16/221, 239, 282, 16/283, 284, 287, 294, 296, 307
See application file for complete search history.

(56) References Cited

U.S. PATENT DOCUMENTS

| | | | |
|---|---|---|---|
| 3,903,567 A * | 9/1975 | Suska | 16/307 X |
| 6,256,839 B1 * | 7/2001 | Wu | 16/283 X |
| 6,499,189 B2 * | 12/2002 | Kondo et al. | 16/239 X |
| 6,510,301 B2 * | 1/2003 | Tanaka | 399/125 |
| 6,615,019 B2 * | 9/2003 | Fujimoto | 399/367 |

FOREIGN PATENT DOCUMENTS

TW                563718          10/1992

* cited by examiner

*Primary Examiner*—Sandra L. Brase

(57) ABSTRACT

A duplex hinge device includes a hinge body having a first end and a second end, a first mounting plate hinged to the first end, and a second mounting plate hinged to the second end. A scanning unit for scanning a to-be-scanned document and generating a print signal is fixed to the hinge body. A printing unit for receiving the print signal and printing a to-be-printed document is fixed to the second mounting plate. A cover for pressing the to-be-scanned document placed on the scanning unit is fixed to the first mounting plate. The duplex hinge device also has a mechanism for locking itself at a plurality of positions.

11 Claims, 6 Drawing Sheets

DUPLEX HINGE DEVICE AND A MULTI-FUNCTION PERIPHERAL USING THE SAME

BACKGROUND OF THE INVENTION

1. Field of the Invention

The invention relates to a duplex hinge device and a MFP (Multi-Function Peripheral) using the same, and more particularly to a duplex hinge device integrating two hinges, and a MFP using the duplex hinge device.

2. Description of the Related Art

Recently, MFPs (Multi-Function Peripherals) have been popularized because they have the functions such as scan, print, or even fax. In a conventional MFP, the printing unit is usually positioned under the scanning unit. The user has to replace the toner or ink cartridge after its lifetime is ended in either the laser or inkjet printing unit. At this time, the user has to open the scanning unit. Alternatively, when the paper jam condition arises in the MFP, the user also has to open the scanning unit in order to eliminate the paper jam condition.

FIG. 1 is a schematic illustration showing a conventional MFP. Referring to FIG. 1, the MFP includes a first hinge 101, a second hinge 102, a scanning unit 103, a printing unit 104, a cover 105 and an oil cylinder 106. The first hinge 101 hinges the cover 105 to the scanning unit 103, and the second hinge 102 hinges the scanning unit 103 to the printing unit 104. During the scan operation, the user opens the cover 105 by rotating it upwards about a rotating shaft of the first hinge 101, places a document on the scanning unit 103, and then closes the cover 105 to perform the scan operation. When the paper jam arises in the MFP or the consumable material in the MFP has to be replaced, the user opens the scanning unit 103 by rotating it upward about a rotating shaft of the second hinge 102. At this time, the oil cylinder 106 functions to support the scanning unit 103 and the cover 105, and then the operation of the elimination of the paper jam or the replacement of the consumable material can be performed.

However, the prior art has the following drawbacks. Because two hinges have to be mounted independently, the assembling processes are complicated and the cost of the MFP cannot be effectively reduced. In addition, because the oil cylinder is required to support the scanning unit, the cost and size of the MFP also cannot be effectively reduced.

Consequently, it is a great benefit to provide a hinge device capable of facilitating the assembling of the MFP and effectively supporting the scanning unit because the size and cost of the MFP can be reduced.

SUMMARY OF THE INVENTION

It is therefore an object of the invention to provide a duplex hinge device to facilitate the assembling of a MFP and to effectively support a scanning unit and a cover.

The invention achieves the above-mentioned object by providing a duplex hinge device, which includes a hinge body having a first end and a second end, a first mounting plate hinged to the first end, and a second mounting plate hinged to the second end. A scanning unit for scanning a to-be-scanned document and generating a print signal is fixed to the hinge body. A printing unit for receiving the print signal and printing a to-be-printed document is fixed to the second mounting plate. A cover for pressing the to-be-scanned document placed on the scanning unit is fixed to the first mounting plate. The duplex hinge device also has a mechanism for locking itself at a plurality of positions.

According to the above-mentioned structure, the user can respectively open the cover and the scanning unit so as to place the document, replace the consumable material or eliminate the paper jam.

DETAILED DESCRIPTION OF THE INVENTION

Figure 1:
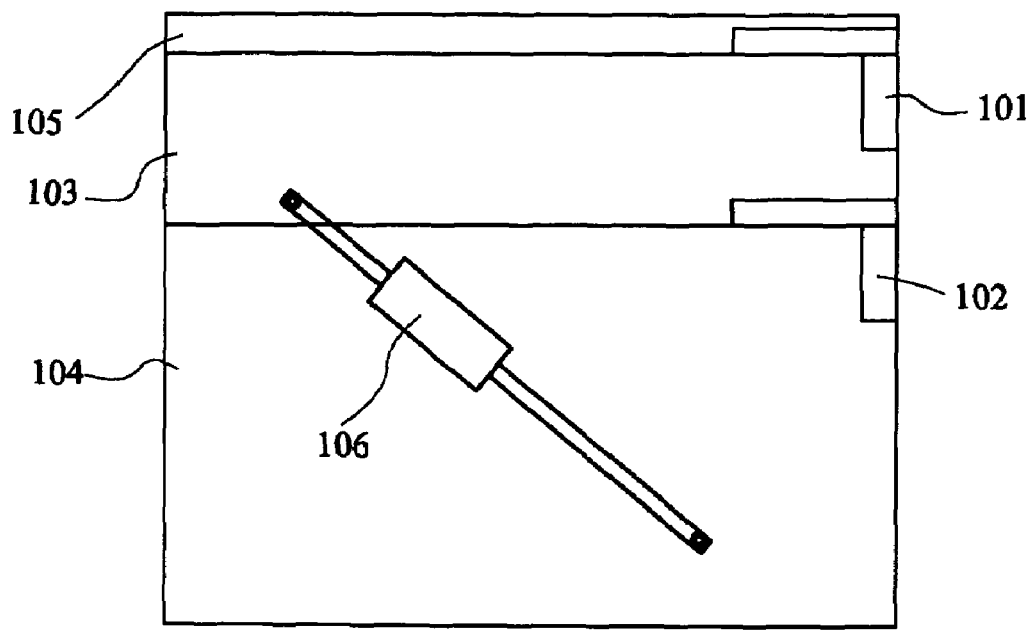
FIG. 1 is a schematic illustration showing a conventional MFP.
Figure 2:
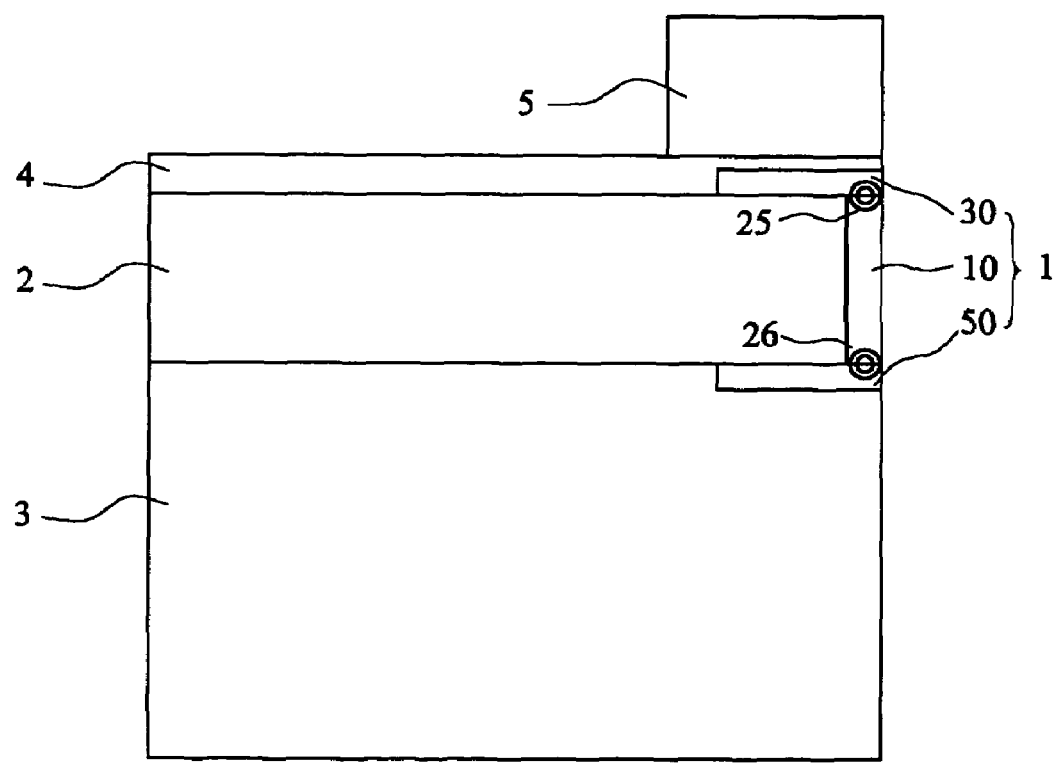
FIG. 2 is a schematic illustration showing a MFP according to a preferred embodiment of the invention.
Figure 3:
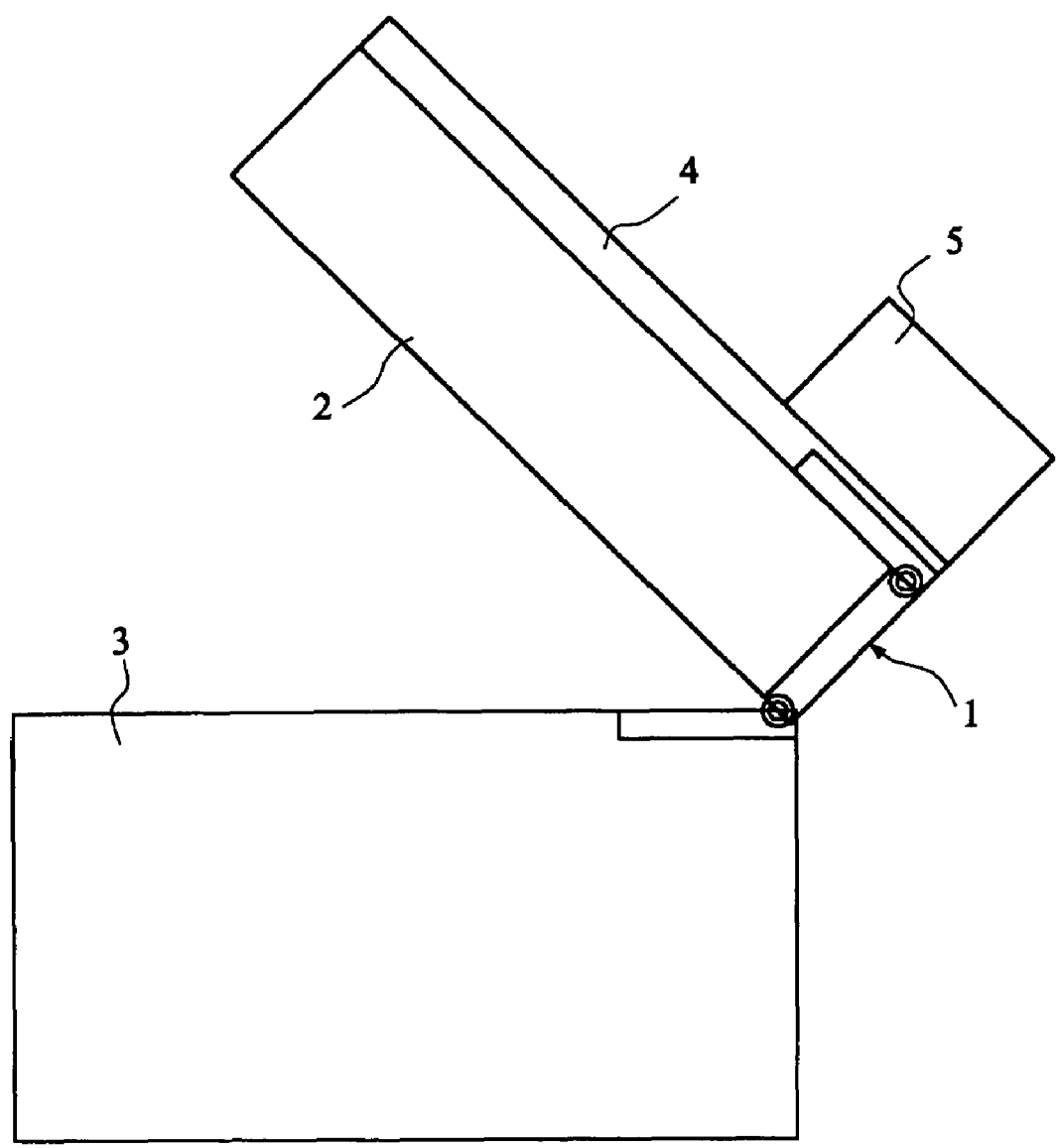
FIG. 3 shows a state when the scanning unit of FIG. 2 is opened.
Figure 4:
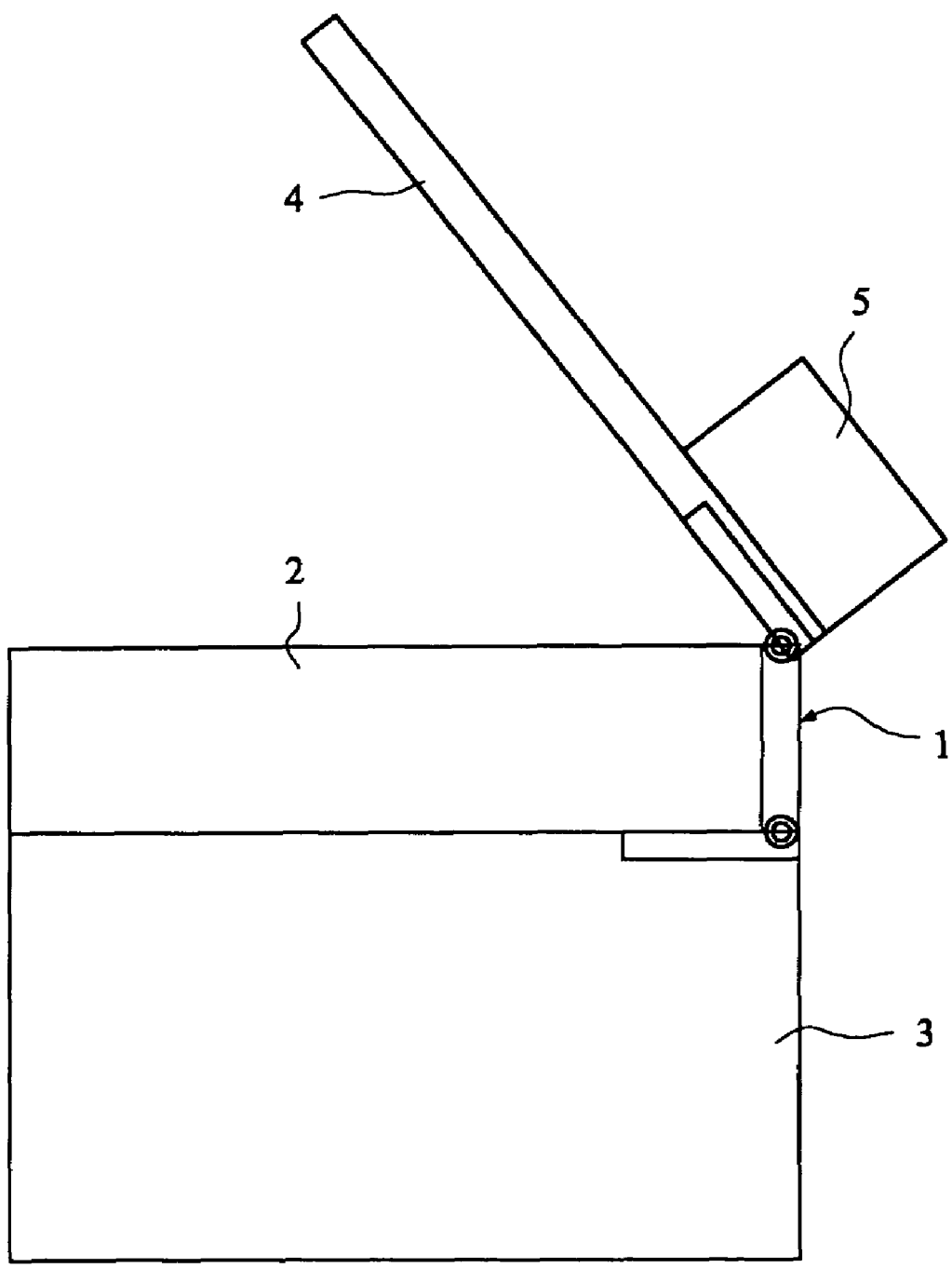
FIG. 4 shows a state when the cover of FIG. 2 is opened.

FIG. 2 is a schematic illustration showing a MFP according to a preferred embodiment of the invention. FIG. 3 shows a state when the scanning unit of FIG. 2 is opened. FIG. 4 shows a state when the cover of FIG. 2 is opened. Referring to FIGS. 2 to 4, the MFP includes a duplex hinge device 1, a scanning unit 2, a printing unit 3, a cover 4 and an ADF (Automatic Document Feeder) 5. It is to be noted that the ADF 5 is an optional member. The duplex hinge device 1 includes a hinge body 10, a first mounting plate 30 and a second mounting plate 50. The hinge body 10 has a first end 25 and a second end 26. The first mounting plate 30 is hinged to the first end 25 and the second mounting plate 50 is hinged to the second end 26.

The scanning unit 2 for scanning a to-be-scanned document and generating a print signal is fixed to the hinge body 10. The document may be placed on a glass window of the scanning unit 2 in a flatbed scanning mode, or on the ADF 5 in a sheet-fed scanning mode. Consequently, the scanning unit 2 has one movable scanning module for performing the flatbed scanning or sheet-fed scanning operation. Even the ADF 5 may have another scanning module for performing a duplex scanning operation together with the scanning module in the scanning unit 2. In order to generate the print signal, the scanning unit 2 must have an image processing module. It is to be noted that the scan signal obtained by the scanning unit 2 may be transferred to a host computer, which can generate the print signal according to the scan signal and transmit the print signal to the printing unit 3 for the printing operation.

The printing unit 3 for receiving the print signal and printing a to-be-printed document is fixed to the second mounting plate 50. The printing unit 3 may be a dot-matrix printing module, an inkjet printing module or a laser printing module. The consumable materials of these printing modules need to be refilled or replaced. Therefore, the printing unit 3 has to be hinged to the scanning unit 2 such that the user can open the scanning unit 2 and perform the operation of replacing or refilling the consumable material, or eliminating the paper jam and maintaining the printing unit.

The cover 4 for pressing the to-be-scanned document placed on the scanning unit 2 is fixed to the first mounting plate 30. The ADF 5 for feeding the to-be-scanned document for the scanning unit 2 to scan is attached to the cover 4. Because the scanning unit 2, the cover 4 and the ADF 5 have the weights that cannot be neglected, the duplex hinge device 1 for supporting the cover 4 and the scanning unit 2 preferably can provide enough supporting forces in order to prevent the scanning unit 2 from falling down to the printing unit 3 under the action of the gravity force, or prevent the cover 4 from falling down to the scanning unit 2 under the action of the gravity force. The detailed structure of the duplex hinge device 1 will be described in the following.

Figure 5:
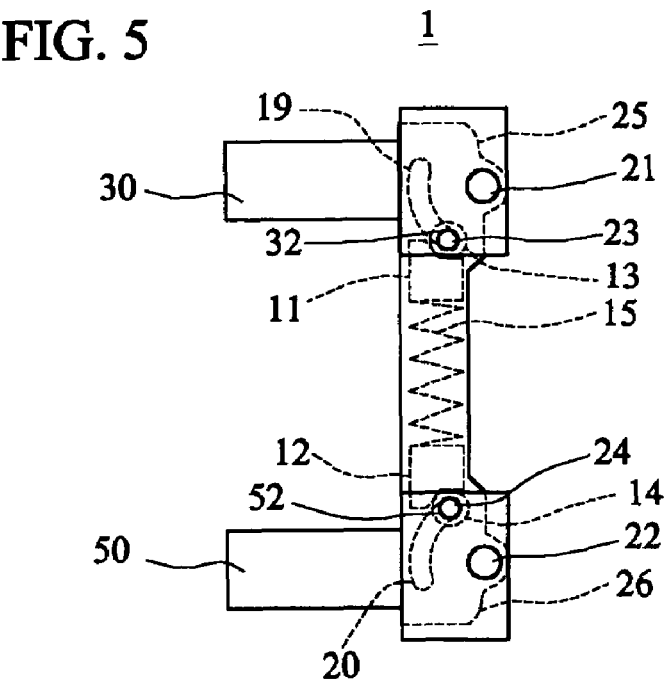
FIG. 5 is a first schematic illustration showing the duplex hinge device of FIG. 2.
Figure 6:
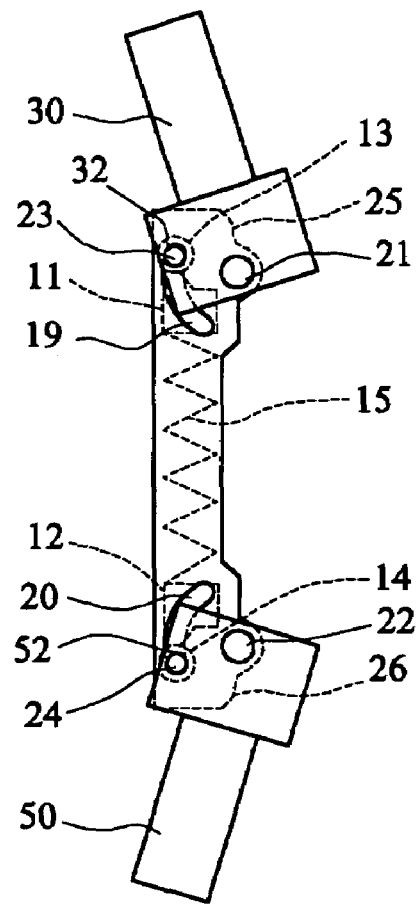
FIG. 6 is a second schematic illustration showing the duplex hinge device of FIG. 2.

FIGS. 5 and 6 are two schematic illustrations showing the duplex hinge device of FIG. 2. Referring to FIGS. 5 and 6, the duplex hinge device 1 includes the hinge body 10, the first mounting plate 30 and the second mounting plate 50, as mentioned hereinabove. In addition, the duplex hinge device further includes a first cam 11, a second cam 12, a first follower 13, a second follower 14, two springs 15, a first pivot 21, a second pivot 22, a first pin 23 and a second pin 24.

The first pivot 21 is hinged to the first end 25 of the hinge body 10 and the first mounting plate 30. The first pin 23 penetrates through a first hole 32 of the first mounting plate 30 and a first guide slot 19 of the hinge body 10, and guides the hinge body 10 and the first mounting plate 30 to rotate relative to each other. The second pivot 22 is hinged to the second end 26 of the hinge body 10 and the second mounting plate 50. The second pin 24 penetrates through a second hole 52 of the second mounting plate 50 and a second guide slot 20 of the binge body 10, and guides the hinge body 10 and the second mounting plate 50 to rotate relative to each other. In this embodiment, the first pin 23 is located apart from the first pivot 21, and the second pin 24 is located apart from the second pivot 22.

The first follower 13 is attached to the first pin 23, and the second follower 14 is attached to the second pin 24. The first cam 11 is slidably attached to the hinge body 10 and in contact with the first follower 13. The second cam 12 is slidably attached to the hinge body 10 and in contact with the second follower 14. The two springs 15 in contact with the first cam 11 and the second cam 12 are for pushing the first cam 11 and the second cam 12 toward the first follower 13 and the second follower 14, respectively. It is to be noted that only one spring is needed without influencing the function of the invention. The profiles of the first cam 11 and the second cam 12 are configured such that the first follower 13 and the second follower 14 are positioned at two or more than two locked positions. For example, FIGS. 5 and 6 respectively show two locked positions, and the user has to apply a predetermined level of force in order to change the state of the duplex hinge device 1. Therefore, the duplex hinge device 1 has the mechanism for locking itself at a plurality of positions.

In FIGS. 5 and 6, the hinge body 10 is formed into a one-piece member. In another embodiment, however, the hinge body 10 also may be constituted by several parts, as mentioned in the following.

Figure 7:
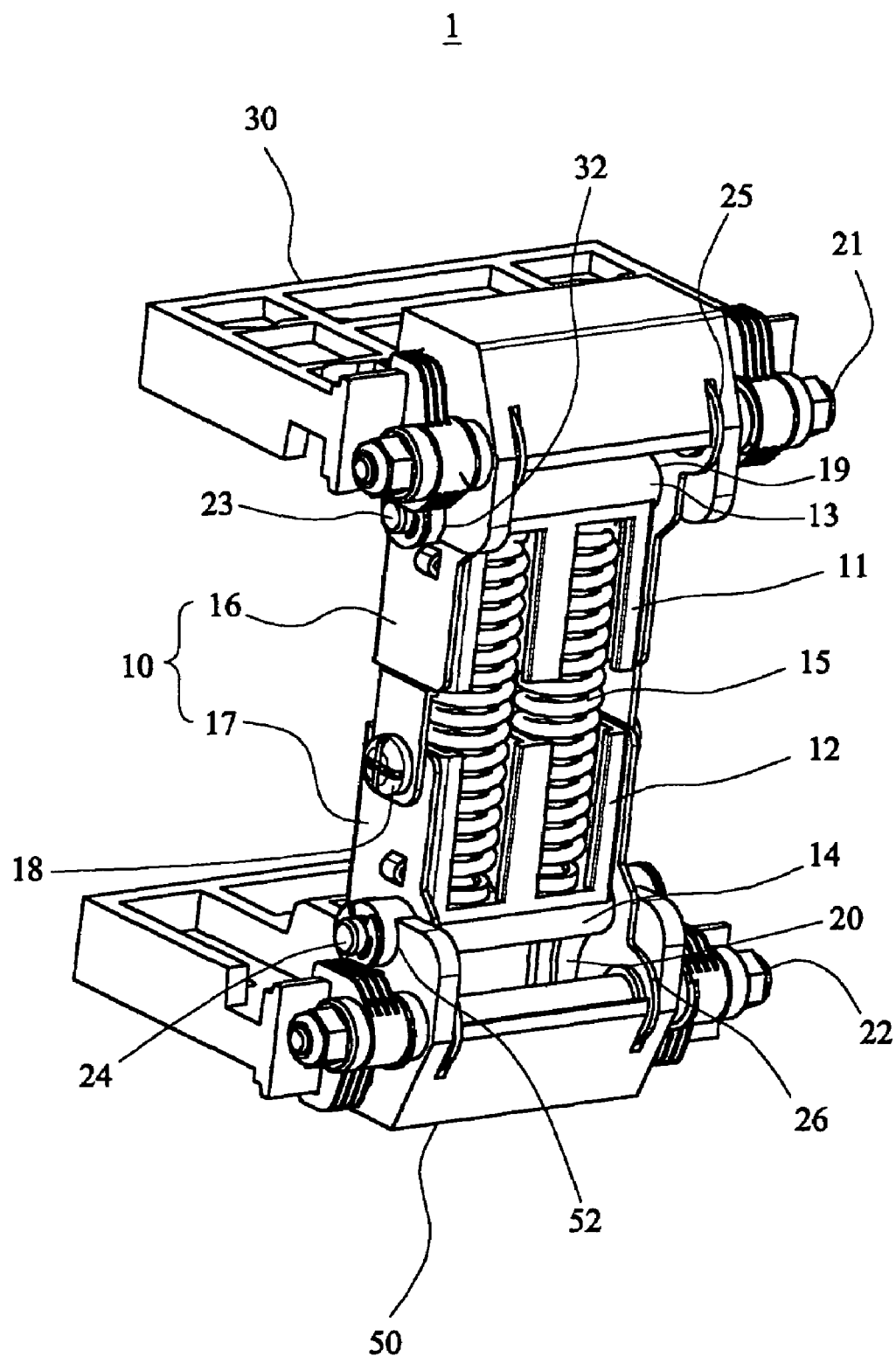
FIG. 7 is a pictorial view showing a detailed structure of the duplex hinge device of FIG. 2.
Figure 8:
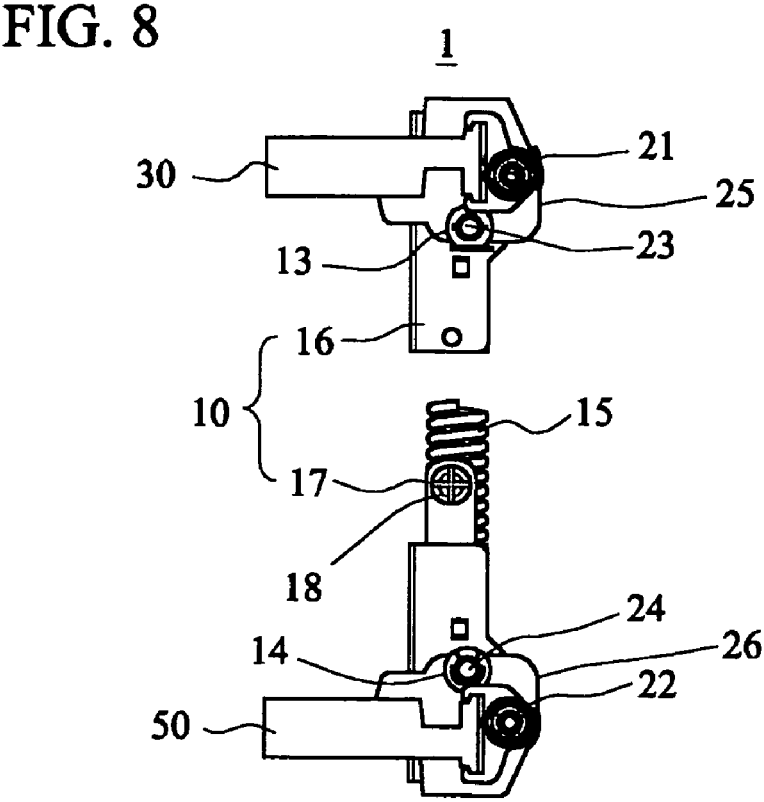
FIG. 8 is a side view showing the duplex hinge device of FIG. 7.
Figure 9:
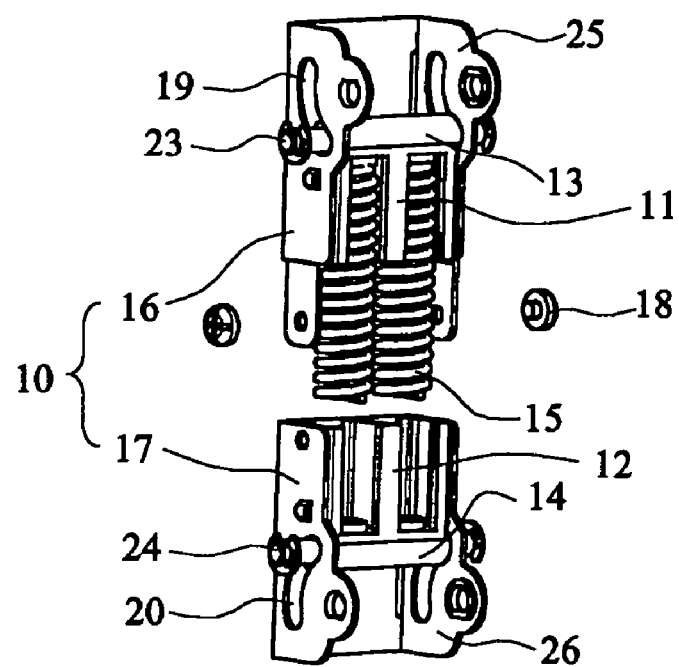
FIG. 9 is a partially pictorial view showing the duplex hinge device of FIG. 7.

FIGS. 7 to 9 are respectively a pictorial view, a side view and a partially pictorial view showing the detailed structure of the duplex hinge device of FIG. 2. In this detailed structure, the hinge body 10 includes a first body 16, a second body 17 and two fixing members (e.g., screws) 18 for fixing the first body 16 to the second body 17, and other structures are the same as those of FIG. 5, which may be clearly understood with reference to FIGS. 7 to 9, and detailed descriptions thereof will be omitted.

According to the above-mentioned structure of the invention, a duplex hinge device capable of facilitating the assembling processes of the MFP and effectively supporting the scanning unit and the cover is provided. When the MFP is being assembled, only one duplex hinge device is needed to achieve the required operations, and there is no need to complicatedly mount two prior art hinges and an oil cylinder. Thus, the assembling processes may be simplified and the cost may be reduced.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A duplex hinge device, comprising:
    a hinge body having a first end and a second end;
    a first mounting plate hinged to the first end;
    a second mounting plate hinged to the second end;
    a first pivot hinged to the first end of the hinge body and the first mounting plate;
    a first pin, which penetrates through a first hole of the first mounting plate and a first guide slot of the hinge body and is for guiding the binge body and the first mounting plate to rotate relative to each other;
    a second pivot hinged to the second end of the hinge body and the second mounting plate; and
    a second pin, which penetrates through a second hole of the second mounting plate and a second guide slot of the hinge body and is for guiding the hinge body and the second mounting plate to rotate relative to each other, wherein the first pin is located apart from the first pivot, and the second pin is located apart from the second pivot.

2. The duplex hinge device according to claim 1, further comprising:
    a first follower attached to the first pin;
    a second follower attached to the second pin;
    a first cam slidably attached to the hinge body and in contact with the first follower;
    a second cam slidably attached to the hinge body and in contact with the second follower; and
    at least one spring, which is in contact with the first cam and the second cam and for respectively pushing the first cam and the second cam toward the first follower and the second follower.

3. The duplex hinge device according to claim 2, wherein the hinge body comprises:
    a first body;
    a second body; and
    a fixing member for fixing the first body to the second body.

4. A MFP (Multi-Function Peripheral), comprising:
    a duplex hinge device, which comprises:
        a hinge body having a first end and a second end;
        a first mounting plate hinged to the first end; and
        a second mounting plate hinged to the second end;
    a scanning unit, which is fixed to the hinge body and for scanning a to-be-scanned document and generating a print signal;
    a printing unit, which is fixed to the second mounting plate and for receiving the print signal and printing a to-be-printed document; and a cover, which is fixed to the first mounting plate and for pressing the to-be-scanned document placed on the scanning unit.

5. The MFP according to claim 4, wherein the duplex hinge device further comprises:
   a first pivot hinged to the first end of the hinge body and the first mounting plate;
   a first pin, which penetrates through a first hole of the first mounting plate and a first guide slot of the hinge body, and is for guiding the hinge body and the first mounting plate to rotate relative to each other;
   a second pivot hinged to the second end of the hinge body and the second mounting plate; and
   a second pin, which penetrates through a second hole of the second mounting plate and a second guide slot of the hinge body, and is for guiding the hinge body and the second mounting plate to rotate relative to each other.

6. The MFP according to claim 5, wherein the duplex hinge device further comprises:
   a first follower attached to the first pin;
   a second follower attached to the second pin;
   a first cam slidably attached to the hinge body and in contact with the first follower;
   a second cam slidably attached to the hinge body and in contact with the second follower; and
   at least one spring, which is in contact with the first cam and the second cam and for respectively pushing the first cam and the second cam toward the first follower and the second follower.

7. The MFP according to claim 6, wherein the hinge body comprises:
   a first body;
   a second body; and
   a fixing member for fixing the first body to the second body.

8. The MFP according to claim 4, further comprising:
   an automatic document feeder, which is attached to the cover and for feeding the to-be-scanned document for the scanning unit to scan.

9. The MFP according to claim 8, wherein the duplex hinge device further comprises:
   a first pivot hinged to the first end of the hinge body and the first mounting plate;
   a first pin, which penetrates through a first hole of the first mounting plate and a first guide slot of the hinge body, and is for guiding the hinge body and the first mounting plate to rotate relative to each other;
   a second pivot hinged to the second end of the hinge body and the second mounting plate; and
   a second pin, which penetrates through a second hole of the second mounting plate and a second guide slot of the hinge body, and is for guiding the hinge body and the second mounting plate to rotate relative to each other.

10. The MFP according to claim 9, wherein the duplex hinge device further comprises:
    a first follower attached to the first pin;
    a second follower attached to the second pin;
    a first cam slidably attached to the hinge body and in contact with the first follower;
    a second cam slidably attached to the hinge body and in contact with the second follower; and
    at least one spring, which is in contact with the first cam and the second cam and for respectively pushing the first cam and the second cam toward the first follower and the second follower.

11. The MFP according to claim 10, wherein the hinge body comprises:
    a first body;
    a second body; and
    a fixing member for fixing the first body to the second body.

* * * * *